(12) United States Patent
Chin

(10) Patent No.: US 8,929,433 B2
(45) Date of Patent: Jan. 6, 2015

(54) SYSTEMS, METHODS, AND APPARATUS FOR IMPROVING DISPLAY OF COMPRESSED VIDEO DATA

(75) Inventor: Douglas Chin, Haverhill, MA (US)

(73) Assignee: Broadcom Corporation, Irvine, CA (US)

(*) Notice: Subject to any disclaimer, the term of this patent is extended or adjusted under 35 U.S.C. 154(b) by 2338 days.

(21) Appl. No.: 11/434,969

(22) Filed: May 16, 2006

(65) Prior Publication Data

US 2006/0257033 A1 Nov. 16, 2006

Related U.S. Application Data

(60) Provisional application No. 60/681,269, filed on May 16, 2005.

(51) Int. Cl.
*H04N 11/02* (2006.01)
*H04N 19/85* (2014.01)
*H04N 19/189* (2014.01)
*H04N 19/61* (2014.01)

(52) U.S. Cl.
CPC ....... *H04N 7/26882* (2013.01); *H04N 7/26313* (2013.01); *H04N 7/50* (2013.01)
USPC .................................................. 375/240.01

(58) Field of Classification Search
CPC .. H04N 7/26313; H04N 7/26882; H04N 7/50
USPC .................................................. 375/240.01
See application file for complete search history.

(56) References Cited

U.S. PATENT DOCUMENTS

| 4,717,956 A * | 1/1988 | Moorhead et al. ......... 348/416.1 |
| 7,343,045 B2 * | 3/2008 | Onuma et al. ................ 382/239 |
| 2001/0016005 A1 * | 8/2001 | Kamikura et al. ....... 375/240.15 |

* cited by examiner

*Primary Examiner* — Anner Holder
(74) *Attorney, Agent, or Firm* — Brinks Gilson & Lione

(57) ABSTRACT

Presented herein are system(s), method(s), and apparatus for improving the display of compressed video data. In one embodiment, there is presented a method for encoding video data. The method comprises estimating a displayed intensity of a video source displayed on a predetermined display device; estimating a displayed intensity of the reconstruction of the video source displayed on a predetermined display device; and correcting the video source as a function of the estimated displayed intensity of the video source on the predetermined display device and the estimated displayed intensity of the reconstruction of the video source on the predetermined display device.

29 Claims, 6 Drawing Sheets

SYSTEMS, METHODS, AND APPARATUS FOR IMPROVING DISPLAY OF COMPRESSED VIDEO DATA

RELATED APPLICATIONS

This application claims priority to "Systems, Methods, and Apparatus for Improving Display of Compressed Video Data", Provisional Application for U.S. Patent Ser. No. 60/681,269, filed May 16, 2005, which is incorporated herein by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video compression is used to compress video data for storage on devices with limited memory and transmission over communication channels with limited bandwidth. A number of video compression standards, such as MPEG-2, VC-1, and AVC compress the video data by, among other things, removing or deemphasizing higher frequency components. The higher frequency components have been observed to be less perceptible to the human eye.

However, when the compressed video data is decompressed and displayed on a display device, the video data has been observed to produce a different intensity compared to the original video data. The intensity difference is the result of the nonlinear response of system. The eye takes things with high spatial frequency and averages their intensity. When a nonlinear response is involved, this averaging changes the perceived value. For example, if a system has a response of $y=x^2$, with the values of x, 1, 2, and 3, the output is 1, 4, and 9. If the input is low pass filtered and changed to 2, 2, and 2, the output is 4, 4, 4. In the original case, the average of the output value is 14/3 In the low pass filtered case, it is 4.

Display devices, such as CRTs, have non-linear characteristics between pixel value and brightness. To compensate for this, the displayed video data is gamma corrected. However, even where the decompressed video is perceptually similar to the original video, its response to gamma correction often produces a different intensity compared to the original video data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in a system, method, and/or apparatus for improving the display of compressed video data, substantially as shown in and/or described in connection with at least one of the figures, as set forth more completely in the claims.

These and other advantages and novel features of the present invention, as well as illustrated embodiments thereof will be more fully understood from the following description and drawings.

DETAILED DESCRIPTION OF PREFERRED EMBODIMENTS

Figure 1:
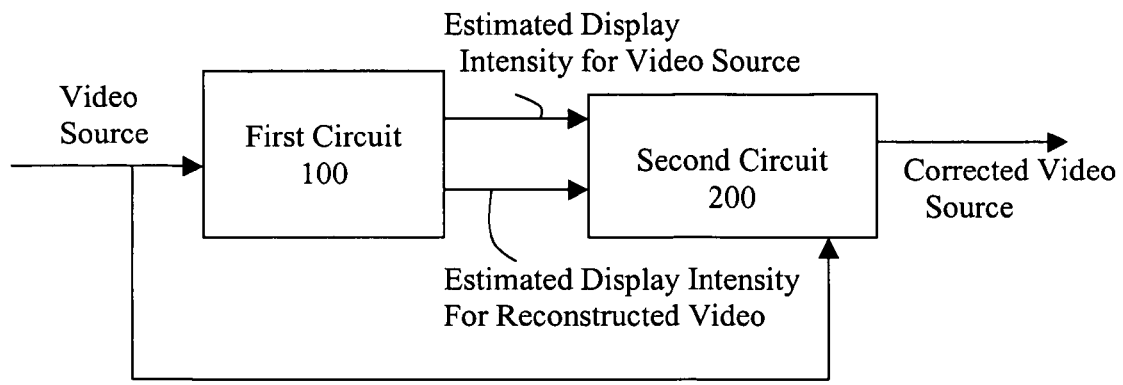
FIG. 1 is a block diagram of an exemplary circuit in accordance with an embodiment of the present invention.

Referring now to FIG. 1, there is illustrated a block diagram describing an exemplary circuit 100 for encoding video data in accordance with an embodiment of the present invention.

The circuit 100 comprises a first circuit 110 and a second circuit 200. The first circuit 110 estimates the display intensity for a video source, when the video source is displayed on a predetermined display device and estimates a displayed intensity of the reconstruction of the video source displayed on a predetermined display device.

It is noted that the video source may be compressed prior to transmission over a communication media. Reconstructed video data can be video data that results from compressing and then decompressed the video source.

The display intensity can be estimated in a variety of ways. In certain embodiments of the present invention, the display intensity can be measured by applying a transformation to the video source and the reconstructed video data that models the predetermined display device.

The display intensity of the reconstructed video source can be estimated in a variety of ways. In certain embodiments of the present invention, the video source can be compressed in accordance with an encoding standard and then decompressed. A transformation modeling the display device can be applied to the decompressed video source to estimate the display intensity of the reconstructed pixels.

The second circuit 200 corrects the video source as a function of the estimated displayed intensity of the video source on the predetermined display device and the estimated displayed intensity of the reconstruction of the video source on the predetermined display device.

In certain embodiments of the present invention, the video source can be corrected as a function of the difference between the estimated displayed intensity of the video source on the predetermined display device and the estimated displayed intensity of the reconstruction of the video source on the predetermined display device. In certain embodiments of the present invention, the difference can comprise the average difference. In accordance with certain embodiments of the present invention, the resulting corrected video source can then be compressed and transmitted over a communication media.

Figure 2:
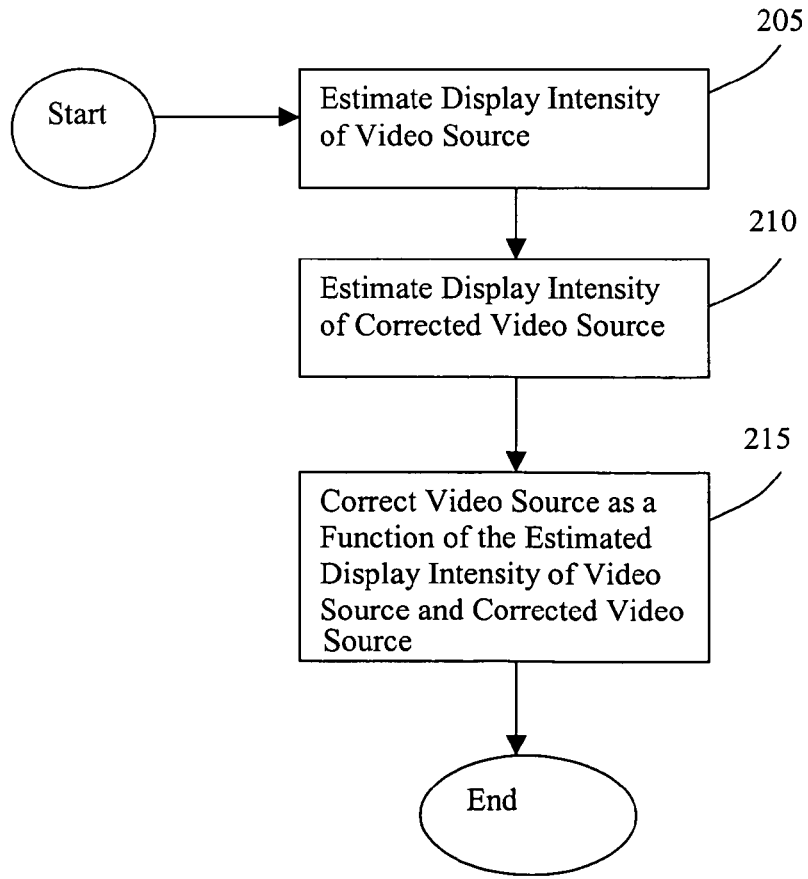
FIG. 2 is a flow diagram for encoding video data in accordance with an embodiment of the present invention.

Referring now to FIG. 2, there is illustrated a flow diagram for encoding video data in accordance with an embodiment of the present invention. At 205, the intensity of the video source displayed on a predetermined display device is estimated. At 210, the intensity of a reconstruction of the video source displayed on the predetermined display device is measured. At 215, the video source is corrected as a function of the estimated displayed intensity of the video source on the predetermined display device and the estimated displayed intensity of the reconstruction of the video source on the predetermined display device.

As noted above, there are a variety of different compression standards for compressing video data. Certain embodiments of the present invention can be incorporated in the context of a compression standard. In certain embodiments of the present invention, the video source can be compressed in accordance with a standard. The reconstruction of the compressed video data can be the resulting video data that is generated by decompressing the compressed video data and the display intensity of the reconstructed data can be estimated. The video source can be corrected according to the display intensity of the video source and the reconstructed video data. The corrected video source can then be compressed and transmitted in accordance with the compression standard. An exemplary compression standard will now be described followed by exemplary embodiments of the present invention.

Advanced Video Coding (also known as H.264 and MPEG-4, Part 10) generally provides for the compression of video data by dividing video pictures into fixed size blocks, known as macroblocks 320. The macroblocks 320 can then be further divided into smaller partitions 430 with varying dimensions.

The partitions 430 can then be encoded, by selecting a method of prediction and then encoding what is known as a prediction error. AVC provides two types of predictors, temporal and spatial. The temporal prediction uses a motion vector to identify a same size block in another picture and the spatial predictor generates a prediction using one of a number of algorithms that transform surrounding pixel values into a prediction. Note that the data coded includes the information needed to specify the type of prediction, for example, which reference frame, partition size, spatial prediction mode etc.

The reference pixels can either comprise pixels from the same picture or a different picture. Where the reference block is from the same picture, the partition 430 is spatially predicted. Where the reference block is from another picture, the partition 430 is temporally predicted.

Spatial Prediction

Figure 3A:
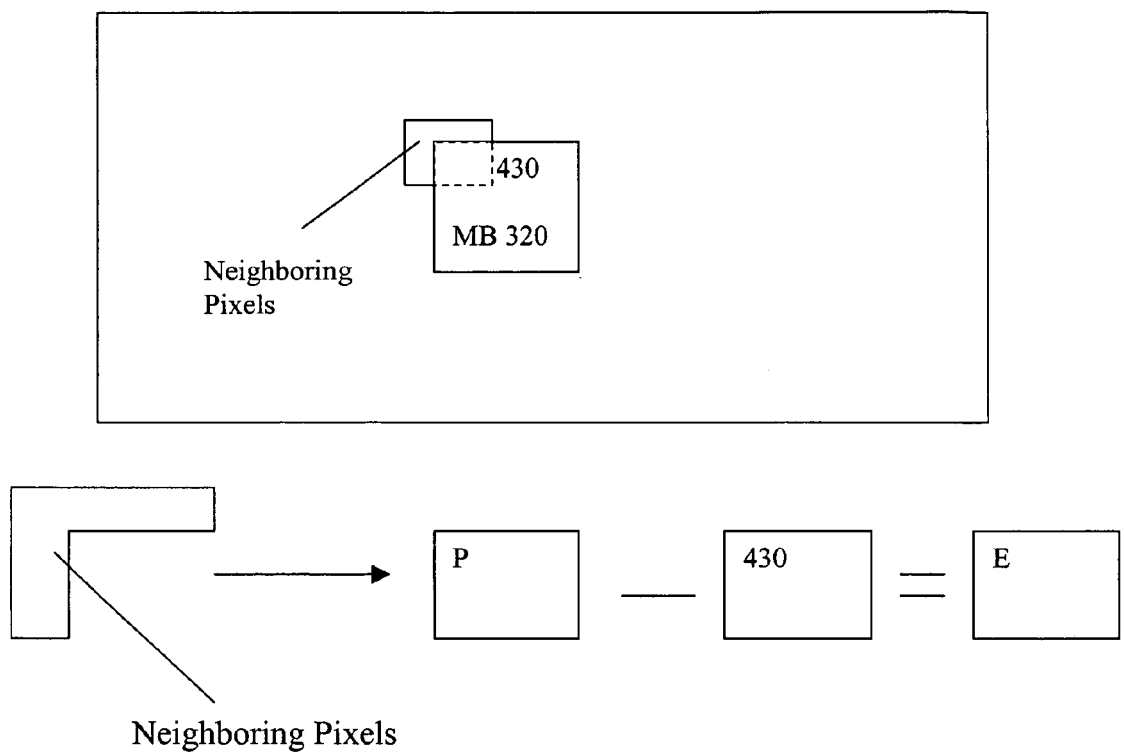
FIG. 3A is a block diagram describing spatial prediction.

Referring now to FIG. 3A, there is illustrated a block diagram describing spatially encoded macroblocks 320. Spatial prediction, also referred to as intra prediction, is used by H.264 and involves prediction of pixels from neighboring pixels. Prediction pixels are generated from the neighboring pixels in any one of a variety of ways.

The difference between the actual pixels of the partition 430 and the prediction pixels P generated from the neighboring pixels is known as the prediction error E. The prediction error E is calculated and encoded.

Temporal Prediction

Figure 3B:
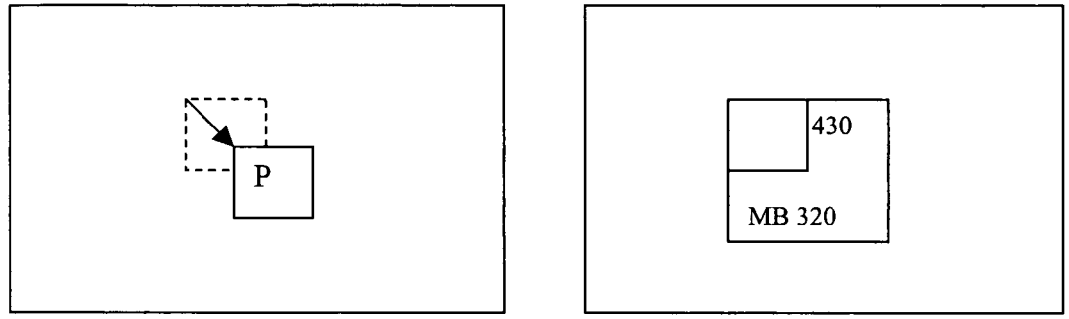
FIG. 3B is a block diagram describing motion prediction.
Figure 3B:
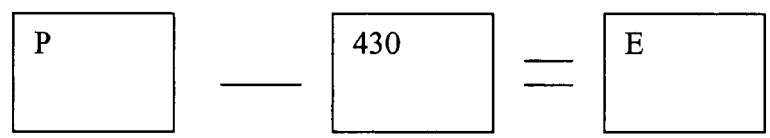

Referring now to FIG. 3B, there is illustrated a block diagram describing temporally prediction. With temporal prediction, partitions 430 are predicted by finding a partition of the same size and shape in a previously encoded reference frame. Additionally, the predicted pixels P can be interpolated from pixels in the frame or field, with as much as ¼ pixel resolution in each direction. A macroblock 320 is encoded as the combination of data that specifies the derivation of the reference pixels P and the prediction errors E representing its partitions 430. The process of searching for the similar block of predicted pixels P in pictures is known as motion estimation.

The similar block of pixels is known as the predicted block P. The difference between the block 430 and the predicted block P is known as the prediction error E. The prediction error E is calculated and encoded, along with an identification of the predicted block P. The predicted blocks P are identified by motion vectors MV and the reference frame they came from. Motion vectors MV describe the spatial displacement between the block 430 and the predicted block P.

Transformation, Quantization, and Scanning

Figure 3C:
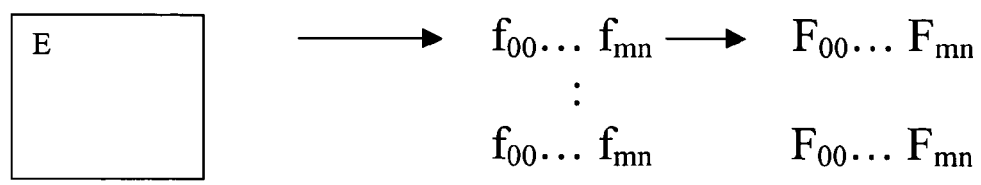
FIG. 3C is a block diagram describing transformation and quantization.

Referring now to FIG. 3C, there is illustrated a block diagram describing the encoding of the prediction error E. With both spatial prediction and temporal prediction, the macroblock 320 is represented by a prediction error E. The prediction error E is a two-dimensional grid of pixel values for the luma Y, chroma red Cr, and chroma blue Cb components with the same dimensions as the macroblock 320, like the macroblock.

In certain embodiments of the present invention, the display intensity of a macroblock 320 of the video source and the display intensity of the corresponding macroblock in the reconstructed video source can be estimated. The difference of the display intensity of the macroblock of the video source and the corresponding macroblock in the reconstructed video source can be added to the prediction error E, thereby resulting in a corrected prediction error.

A transformation transforms the prediction errors E to the frequency domain. In H.264, the blocks can be 4×4, or 8×8. The foregoing results in sets of frequency coefficients $f_{00} \ldots f_{mn}$, with the same dimensions as the block size. The sets of frequency coefficients are then quantized, resulting in sets 440 of quantized frequency coefficients, $F_{00} \ldots F_{mn}$.

Quantization is a lossy compression technique where the amount of information that is lost depends on the quantization parameters. The information loss is a tradeoff for greater compression. In general, the greater the information loss, the greater the compression, but, also, the greater the likelihood of perceptual differences between the encoded video data, and the original video data.

The pictures 115 are encoded as the portions 120 forming them. The video sequence is encoded as the frames forming it. The encoded video sequence is known as a video elementary stream.

Figure 4:
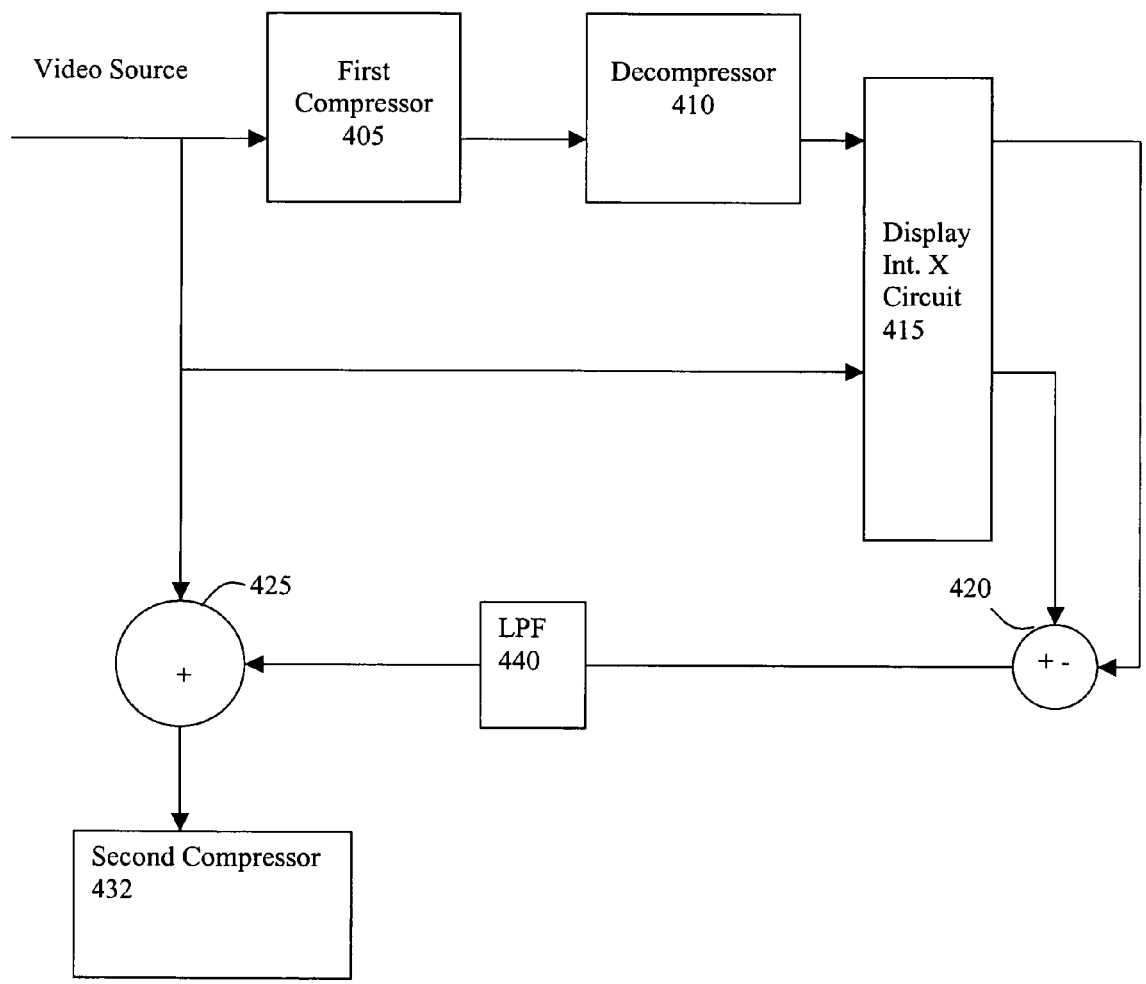
FIG. 4 is a block diagram of an exemplary circuit in accordance with an embodiment of the present invention.

Referring now to FIG. 4, there is illustrated a block diagram of an exemplary circuit for encoding video data in accordance with an embodiment of the present invention. The circuit comprises a first compressor 405, a decompressor 410, a display intensity transformation circuit 415, a subtractor 420, an adder 425, and a second compressor 432.

The first compressor 405 compresses the video source. The decompressor 410 decompresses the video source, thereby resulting in a reconstructed video source. The display intensity transformation circuit 415 measures the display intensity for the video source and the reconstructed video source. The subtractor 420 measures the difference of the display intensity for the video source and the reconstructed video source. The adder 425 adds the difference of the display intensity to the video source, thereby resulting a corrected video source. The second compressor 430 compresses the corrected video source. In certain embodiments, a low pass filter 440 filters the difference.

Figure 5:
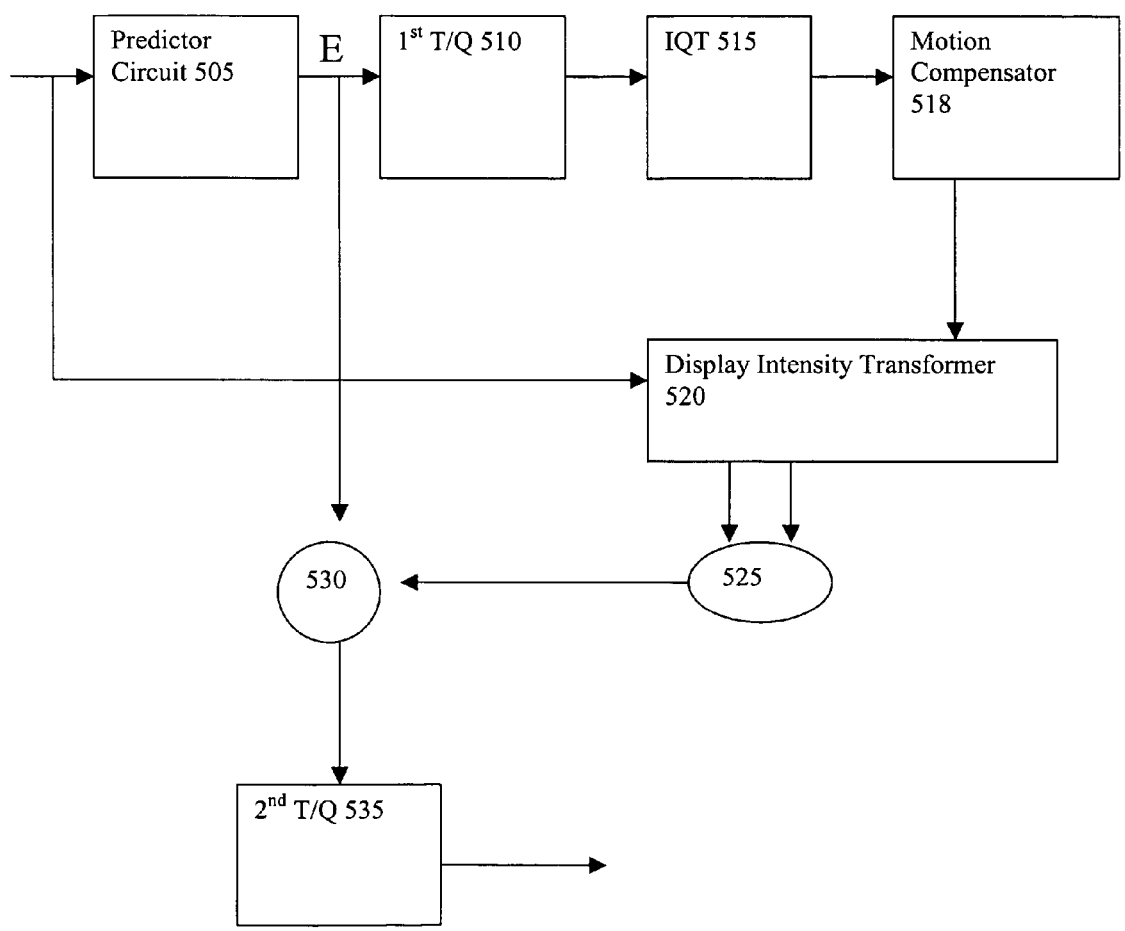
FIG. 5 is a block diagram of an exemplary circuit in accordance with an embodiment of the present invention.

Referring now to FIG. 5, there is illustrated a block diagram of another exemplary circuit in accordance with an embodiment of the present invention. The circuit comprises a predictor circuit 505, first transformer/quantizer 510, an inverse quantizer/transformer 515, a motion compensator 518, a display intensity transformer 520, a subtractor 525, an adder 530, and a second transformer/quantizer 535.

The predictor 505 receives actual blocks from the video source for either spatial or motion prediction and outputs a prediction error E and an identification of the reference pixels. It is noted that the reference pixels can be identified by a motion vector (where the case is motion prediction). The transformer/quantizer 510 transforms and quantizes the prediction error E. The inverse quantizer/transformer 515 inverse quantizes and transforms, providing a reconstructed prediction error E'.

Display intensity transformer 520 determines the display intensity for the reconstructed prediction error E' and the original prediction error E. The subtractor 525 provides the difference between the display intensity for the prediction error E and the reconstructed prediction error E'. Adder 530 adds the difference to the original prediction error E', thereby resulting in a corrected prediction error. The second transformer/quantizer 535 transforms and inverse quantizes the corrected prediction error.

Figure 6:
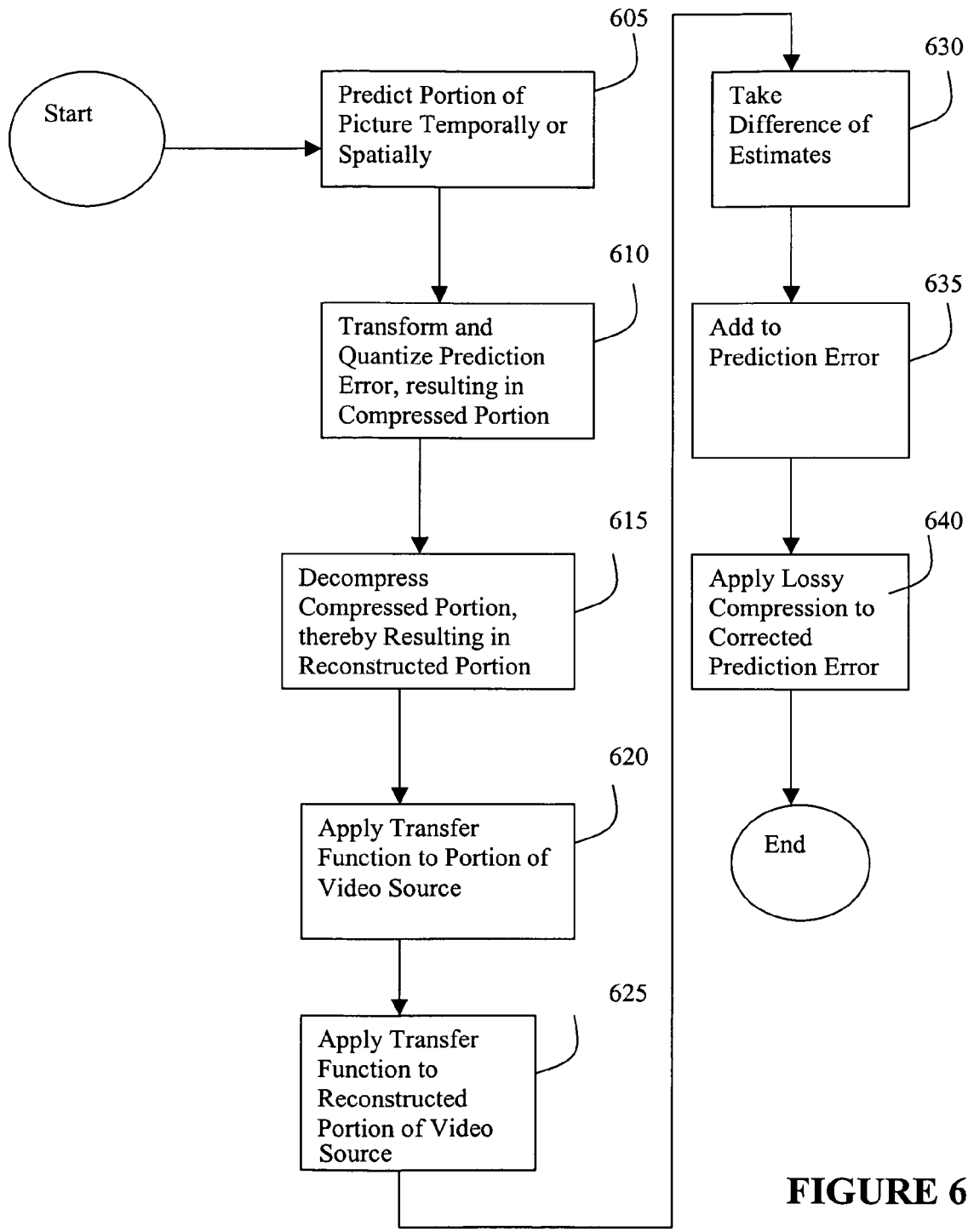
FIG. 6 is a flow diagram for encoding video data in accordance with an embodiment of the present invention.

Referring now to FIG. 6, there is illustrated a flow diagram for encoding video data in accordance with an embodiment of the present invention. At 605, a portion of a picture from the video source is predicted, either temporally or spatially, thereby resulting in a prediction error. At 610, the prediction error is transformed and quantized, thereby resulting in a compressed portion of the video source.

At 615, the compressed video source is decompressed, thereby resulting in a reconstructed portion of the video source. A transfer function that models the predetermined display device is applied to portion of the video source at 620 and the reconstructed video source at 625 to estimate the display intensity of the portion of the video source and the reconstructed portion of the video source.

At 630, the difference between the estimated display intensity of the portion of the video source and the reconstructed portion of the video source is taken, and added to the prediction error at 635, thereby resulting in a corrected prediction error. At 640, lossy compression is applied to the prediction error.

The embodiments described herein may be implemented as software, a board level product, as a single chip, application specific integrated circuit (ASIC), or with varying levels of the decoder system integrated with other portions of the system as separate components.

The degree of integration of the decoder system will primarily be determined by the speed and cost considerations. Because of the sophisticated nature of modern processor, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on H.264 encoded video data, the invention can be applied to a video data encoded with a wide variety of standards.

Therefore, it is intended that the present invention not be limited to the particular embodiment disclosed, but that the present invention will include all embodiments falling within the scope of the appended claims.

The invention claimed is:

1. A method for encoding video data, said method comprising:
    estimating a displayed intensity of a video source displayed on a display device;
    compressing the video source;
    estimating a displayed intensity reconstruction of the video source displayed on the display device; and
    correcting the video source as a function of the estimated displayed intensity of the video source on the display device and the estimated displayed intensity of the reconstruction of the video source on the display device, wherein correcting the reconstruction of the video source further comprises:
        low pass filtering the difference between the estimate of the displayed intensity of the video source and the displayed intensity of the reconstruction of the video source; and
        adding the low pass filtered difference to the video source.

2. The method of claim 1, wherein estimating the displayed intensity of the video source displayed on the display device further comprises:
    applying a transfer function that models the display device to the video source.

3. The method of claim 1, wherein correcting the video source as a function of the estimated display intensity of the video source on the display device and the estimated displayed intensity of the reconstruction of the video source on the display device further comprises correcting the video source as a function of the difference between the estimated displayed intensity of the video source on the display device and the estimated displayed intensity of the reconstruction of the video source on the display device.

4. The method of claim 1, further comprising:
    compressing the video source, thereby resulting in a compressed video source, wherein the reconstruction of the video source comprises a resulting decompression of the compressed video source; and
    compressing the corrected video source.

5. The method of claim 4, further comprising decompressing the compressed video source.

6. The method of claim 1, wherein estimating the display intensity of the reconstruction of the video source comprises:
    applying a low pass filter to the video source.

7. The method of claim 6, further comprising:
    controlling the low pass filter with a rate controller that controls an encoding rate of the video source.

8. The method of claim 1, wherein correcting the video source further comprises:
    predicting at least a portion of the video source, thereby resulting in a prediction error; and
    correcting the prediction error as a function of an estimate of the display intensity of at least the portion of the video source and an estimate of the display intensity of the reconstruction of at least the portion of the video source, thereby resulting in a corrected prediction error.

9. The method of claim 8, wherein predicting at least the portion of the video source comprises spatially predicting at least the portion of the video source.

10. The method of claim 8, wherein predicting at least the portion of the video source comprises temporally predicting at least the portion of the video source.

11. The method of claim 8, further comprising:
compressing the corrected prediction error.

12. The method of claim 11, wherein compressing the corrected prediction error further comprises applying lossy compression to the prediction error.

13. An encoder for encoding video data, said encoder comprising:
a first circuit for estimating a displayed intensity of a video source displayed on a display device, compressing the video source, and estimating a displayed intensity of the reconstruction of the compressed video source displayed on a display device; and
a second circuit for correcting the video source as a function of the estimated displayed intensity of the video source on the display device and the estimated displayed intensity of the reconstruction of the video source on the display device, wherein second circuit comprises a low pass filter for low pass filtering the difference between the estimate of the displayed intensity of the video source and the displayed intensity of the reconstruction of the video source, and the second circuit being operable to add the low pass filtered difference to the video source.

14. The encoder of claim 13, wherein the first circuit comprises a transformer for applying a transfer function that models the display device to the video source.

15. The encoder of claim 13, wherein correcting the reconstruction of the video source as a function of the estimated displayed intensity of the video source on the display device and the estimated displayed intensity of the reconstruction of the video source on the display device further comprises correcting the reconstruction of the video source as a function of the difference between the estimated displayed intensity of the video source on the display device and the estimated displayed intensity of the reconstruction of the video source on the display device.

16. The encoder of claim 13, further comprising:
at least one compressor for compressing the video source, thereby resulting in a compressed video source, wherein the reconstruction of the video source comprises a resulting decompression of the compressed video source and for compressing the corrected video source.

17. The encoder of claim 16, further comprising a decompressor for decompressing the compressed video source.

18. The encoder of claim 13, wherein estimating the display intensity of the reconstruction of the video source comprises:
applying a low pass filter to the video source.

19. The encoder of claim 18, further comprising:
a rate controller for controlling the encoding rate of the corrected video source and controlling the low pass filter.

20. The encoder of claim 13, wherein correcting the video source further comprises:
a prediction circuit for predicting at least a portion of the video source, thereby resulting in a prediction error; and
wherein the second circuit corrects the prediction error as a function of an estimate of the display intensity of at least the portion of the video source and an estimate of the display intensity of the reconstruction of at least the portion of the video source.

21. The encoder of claim 20, wherein the prediction circuit comprises an interprediciton circuit for predicting at least the portion of the video source comprises spatially predicting at least the portion of the video source.

22. The encoder of claim 20, wherein the prediction circuit comprises a motion compensator for predicting at least the portion of the video source comprises temporally predicting at least the portion of the video source.

23. The encoder of claim 20, further comprising a compressor for lossy compressing the corrected prediction error.

24. The encoder of claim 23, wherein compressor comprises:
a transformer for transforming the corrected prediction error, thereby resulting in a transformed corrected prediction error; and
a quantizer for quantizing the transformed corrected prediction error.

25. An encoder for encoding video data, said encoder comprising:
a first circuit operable to:
estimate a displayed intensity of a video source displayed on a display device, compress the video source; and
estimate a displayed intensity of a reconstruction of the compressed video source displayed on a display device; and
a second circuit, coupled to the first circuit, said second circuit being operable to correct intensity of the video source as a function of the estimated displayed intensity of the video source on the display device and the estimated displayed intensity of the reconstruction of the video source on the display device, wherein the second circuit, during the correction of the intensity, is operable to:
low pass filter the difference between the estimate of the displayed intensity of the video source and the displayed intensity of the reconstruction of the video source; and
add the low pass filtered difference to the video source.

26. The method according to claim 1, wherein a motion compensator is applied prior to the correcting.

27. The method according to claim 1, wherein a second compression is applied to a result of the adding the low pass filtered difference to the video source.

28. The encoder according to claim 13, wherein the second circuit is operable to apply a motion compensator prior to the correcting.

29. The method according to claim 16, further comprising:
a low pass filter configured to low pass filter the difference between the estimate of the displayed intensity of the video source and the displayed intensity of the reconstruction of the video source;
an adder configured to combine the low pass filtered difference to the video source; and
a second compressor is applied to a result of the adding the low pass filtered difference to the video source.

* * * * *

UNITED STATES PATENT AND TRADEMARK OFFICE
CERTIFICATE OF CORRECTION

PATENT NO. : 8,929,433 B2  
APPLICATION NO. : 11/434969  
DATED : January 6, 2015  
INVENTOR(S) : Chin Page 1 of 1

It is certified that error appears in the above-identified patent and that said Letters Patent is hereby corrected as shown below:

In the Claims

Column 8, Claim 21, Line 7, "interprediciton" should be --interprediction--.

Signed and Sealed this  
Thirty-first Day of March, 2015

Michelle K. Lee  
*Director of the United States Patent and Trademark Office*